July 14, 1970   E. H. AUGUSTIN   3,520,457
METHOD OF SEPARATING PIECES OF EDGE TRIM REMAINING AFTER
THE CUTTING OF A GLASS BRACKET
Filed Oct. 7, 1968   3 Sheets-Sheet 1
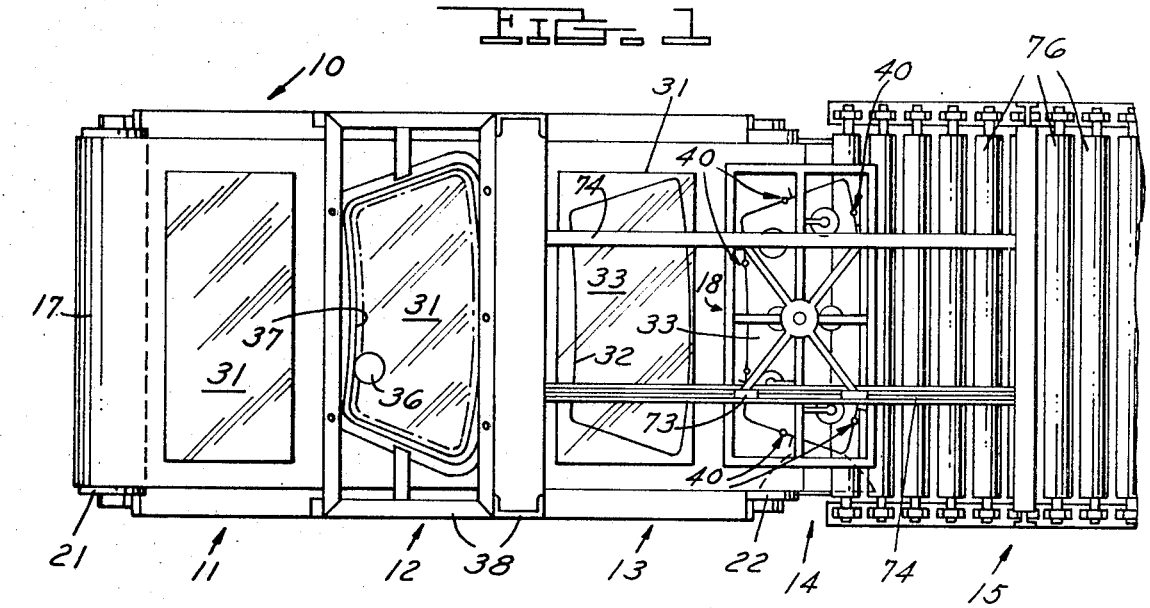
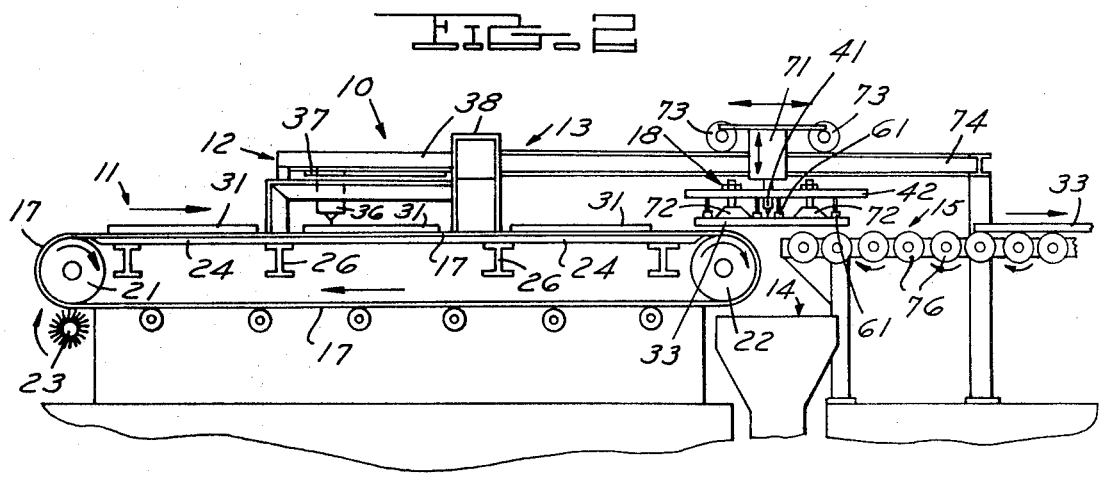
EUGENE H. AUGUSTIN
GEORGE J. PAGAN
INVENTORS
BY John R. Faulkner
William E. Johnson
ATTORNEYS

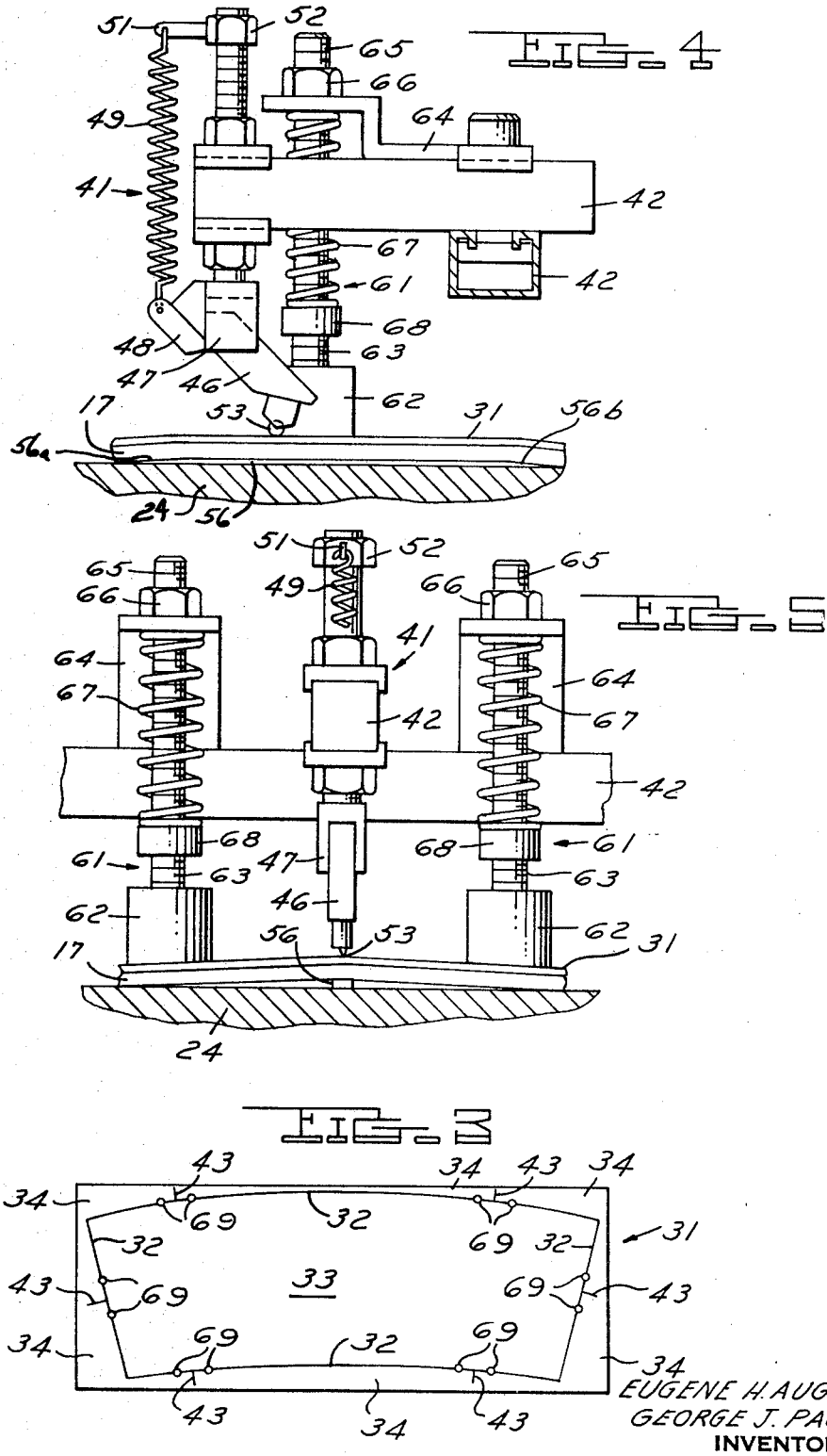

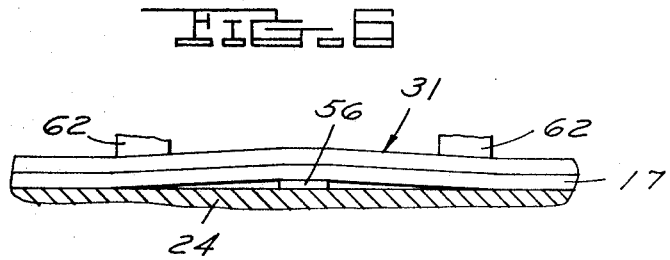
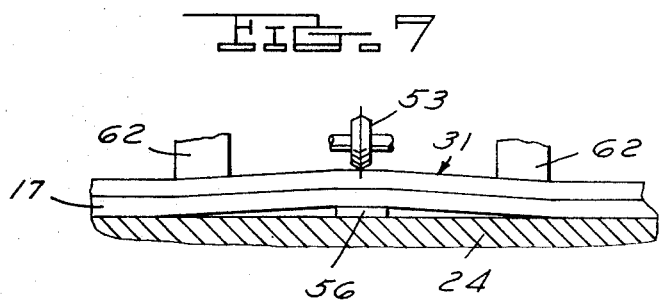
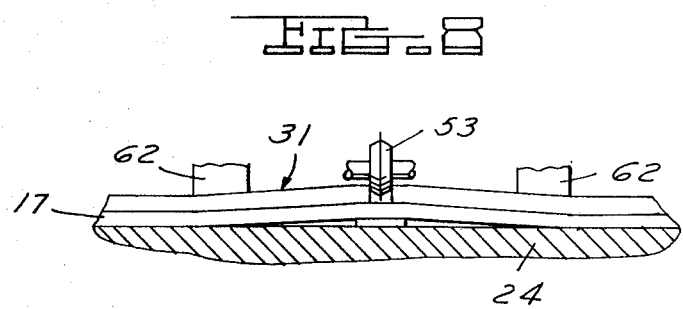
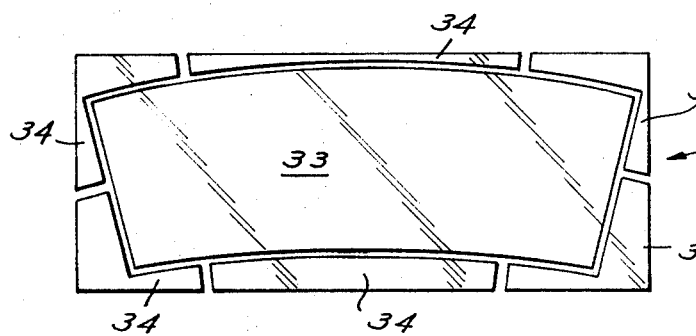
EUGENE H. AUGUSTIN
GEORGE J. PAGAN
INVENTORS
BY John R. Faulkner
William E. Johnson
ATTORNEYS

United States Patent Office 3,520,457
Patented July 14, 1970

3,520,457
METHOD OF SEPARATING PIECES OF EDGE TRIM REMAINING AFTER THE CUTTING OF A GLASS BRACKET
Eugene H. Augustin, Dearborn Heights, and George J. Pagan, Dearborn, Mich., assignors to Ford Motor Company, Dearborn, Mich., a corporation of Delaware
Filed Oct. 7, 1968, Ser. No. 765,509
Int. Cl. B26f 3/00
U.S. Cl. 225—2
6 Claims

ABSTRACT OF THE DISCLOSURE

A method of separating adjacent pieces of glass edge trim remaining after a glass template has been cut from a glass bracket has the following steps. A glass scoring tool is moved over the surface of the glass bracket in an area of the glass bracket between its lateral edge and the glass template shape defined thereon, the tool thereby placing a score on the surface. The glass is broken along the score to open the score. When the score is open, the lateral edges of adjacent pieces of edge trim remain in close proximity to one another. The scoring tool is moved downwardly into a position between the adjacent lateral edges of the pieces of edge trim to separate the lateral edges of the pieces at that position. The scoring tool is then moved along at least a portion of the length of the open score thereby to separate the lateral edges of the adjacent pieces of edge trim permitting easy removal therefrom of the glass template which has been cut from the glass bracket. A preferred direction of movement of the scoring tool for both the scoring and the separating operations is described as well as an apparatus for performing the method.

BACKGROUND OF THE INVENTION

In the glass cutting art, a rectangular piece of glass serving as the stock material for a glass cutting operation is referred to as a glass bracket. The glass configuration or shape cut from the glass bracket is identified as a glass template. In a standard glass cutting operation, the template shape is scored on a surface of the glass bracket by a scoring tool. This score is subsequently run through from the scored surface to the unscored surface of the bracket whereby the glass template shape is cut from the remaining portion of the bracket, which remaining portion is discardable edge trim.

In attempting to separate a glass template from its surrounding edge trim, the removal of the template from directly contacting edge trim presents certain problems because the template does not have a high resistance to the formation of chips when separated from the edge trim. When the score defining the template shape is run in the glass, imperfections and flares are left sometimes at the corners of the template shape. These imperfections and flares are in the form of protrusions extending outwardly from the lateral edge of the glass template generally at the corners thereof. These protrusions are generally formed on the lower portion of the lateral edge of the template away from the scored surface of the glass bracket. With the protrusions in such a position, when the glass template is lifted upwardly from the edge trim without moving the lateral edges of the edge trim away from contacting relationship with the lateral edges of the templtae, the protrusions are broken off and chips are formed in the glass template.

SUMMARY OF THE INVENTION

This invention relates to a method of cutting glass and, more particularly, to a method of separating pieces of glass edge trim from a glass template which has been cut from a glass bracket.

The method of separating adjacent pieces of glass edge trim from a glass template which has been cut from a glass bracket has at least the following steps. A glass scoring tool is moved over the surface of the glass bracket in an area of the glass bracket between its marginal edge and the glass template shape defined thereon thereby to place a score on the surface. The glass is broken along the score to open the same, the lateral edges of the adjacent pieces of edge trim defined by the open score being in close proximity to one another. A separating tool is moved downwardly into a position between the adjacent lateral edges of the pieces of edge trim to separate the lateral edges at that position. The separating tool is then moved along at least a portion of the length of the open score thereby to separate further the lateral edges of the adjacent pieces of edge trim and to move the edge trim away from the glass template.

In greater detail, the separating tool moved along the lateral edges of the pieces of edge trim is the scoring tool utilized in the scoring operation. During the glass scoring operation, the tool is moved in one direction. During the separation of the adjacent pieces of edge trim, the scoring tool is moved in the opposite direction.

In still greater detail, the method of this invention teaches the movement of the scoring tool in a direction from the lateral edge of the glass bracket toward the score defining the glass template shape on the bracket to accomplish the scoring operation. The method then teaches movement of the scoring tool in the opposite direction to accomplish the glass separation operation. The method also teaches the utilization of a plurality of scoring tools when the glass template shape is of closed configuration.

BRIEF DESCRIPTION OF THE DRAWINGS

FIG. 1 is a plan view of apparatus capable of performing the method of this invention in which a glass template is cut and stripped from a glass bracket. FIG. 2 is an elevational view of the apparatus of FIG. 1. FIG. 3 is a plan view of a glass bracket scored to define a glass template shape therein. FIG. 4 is a side elevational view of a portion of the apparatus of FIGS. 1 and 2 which aids in the separation of edge trim after cutting of the glass bracket. FIG. 5 is an end elevational view of the portion of the apparatus shown in FIG. 4. FIGS. 6, 7 and 8 are schematic drawings showing the manner in which the apparatus of FIGS. 1 and 2 performs the method of this invention. FIG. 9 is a plan view of the glass bracket of FIG. 3 after the glass cutting and edge trip operation has been completed thereon.

DESCRIPTION OF THE PREFERRED EMBODIMENT

General

The overall description of the detailed method of this invention includes the cutting and stripping of a glass template from a glass bracket. This detailed method will be described in conjunction with FIGS. 1 and 2 of the drawings. When a glass template is cut from a glass bracket, the material to be separated from the glass template after the cutting operation is referred to as the edge trim.

In FIGS. 1 and 2, there is shown a glass cutting and stripping machine generally designated by the numeral 10. This machine has a glass loading station 11, a glass scoring station 12, a glass stripping and edge trim removing station 13, a glass disposal station 14, and a template unloading station 15. An endless belt 17 and a movable stripping and lifting device 18 interconnects the various stations of the machine 10 in a manner which will be described below.

The endless belt 17, which is formed of a yieldable material such as hard rubber, is indexed around a pair of pulleys 21 and 22 by a suitable indexing mechanism which is conventional and not shown. Disposed below the pulley 21 is a rotary brush 23 which brushes the endless belt to remove any glass particles which remain thereon after the belt has moved through the machine.

Upon each index of the belt 17, a portion thereof is presented to the glass loading station 11. At this station and at the next two adjacent stations, the endless belt is supported on a metal plate 24 which, in turn, is supported by structural members 26. At the loading station, a glass bracket 31 is placed on the belt by an operator or by a mechanical handling apparatus which is conventional and not shown.

The next index of the belt 17 causes advancement of the glass bracket 31 from the loading station 11 to the glass scoring station 12. At the glass scoring station, a glass scoring tool 36 is actuated and brought into engagement with the surface of the glass bracket not engaging the belt. The glass scoring tool is moved about a tool guide track 37 while the scoring tool is in engagement with the top surface of the bracket. This action places a score 32 (see FIG. 3) on the glass bracket 31 to define a glass template shape 33 on the surface thereof. The score 32 is in the form of a plurality of fissures in the glass which do not go completely through the thickness of the glass. The glass scoring tool and the tool guide track are supported above the endless belt 17 by structural members 38 secured to the structural members 26. The tool and track are of standard construction and no further description thereof will be contained herein.

The next index of the endless belt 17 moves the scored glass bracket 31 to the glass stripping and edge trim removing station 13. At this station, the movable glass stripping and lifting device 18 is utilized, (1) to place secondary scores on the glass bracket, (2) to cut the glass template 33 from the bracket and (3) to remove the template from the edge trim.

In FIGS. 4 and 5, there is shown the apparatus associated with the stripping and lifting device 18 which places secondary scores on the glass bracket 31 to permit subsequent separation and removal of the glass template 33 from edge trim 34 remaining after the cutting of the bracket. One of the secondary scoring apparatuses is shown in FIGS. 4 and 5 and generally designated by the numeral 41. The apparatus is affixed to frame members 42 of the stripping and lifting device 18. In the preferred embodiment, wherein a windshield is formed by the glass template 33, six of the secondary scoring apparatuses 41 are utilized about the periphery of the score 32. The location of the six apparatuses on the device 18 is designated by the numeral 40 in FIG. 1 and, as shown therein, are spaced from the corners of the template shape. Also, these apparatuses place secondary scores 43 in the six positions designated in FIG. 3. Since each of the secondary scores is placed on the glass bracket 31 in the same manner, only the operation of a single apparatus will be described in detail.

Each secondary scoring apparatus 41 has a member 46 attached for pivotable movement to a block 47 secured to the frame member 42. The member 46 has an upwardly extending portion 48 thereof which has one end of a spring 49 attached thereto. The other end of the spring is attached to a member 51 associated with an adjustable bolt 52, which bolt is, in turn, secured to the frame member 42. The pivotable member 46 also supports on the lower portion thereof a cutter wheel 53, the cutter wheel being of such a type that when moved across the surface of the glass bracket 31, it will produce a secondary score in the glass bracket. This score is formed as a plurality of fissures in the glass which do not extend through to the bottom surface of the bracket.

When the glass bracket 31 is indexed to the stripping and edge trim removing station 13, areas of the upper surface of the glass bracket 31 underlying each of the six secondary scoring apparatuses 41 are raised upwardly by means of cam strips 56 provided at each one of the six locations. These cam strips have tapered front and back surfaces 56a and b (see FIG. 4) to allow easy passage of the belt 17 thereover.

As best seen in FIGS. 4 and 5, a pair of pressure applying members, generally designated by the numeral 61, are mounted on opposite sides of the secondary scoring apparatus 41. Each pressure applying member 61 has a pressure pad portion 62 on the lower end thereof formed of a semi-rigid material such as neoprene rubber or heavy felt and having a diameter of about 1¼ inches. The pressure pad portion is secured to a shaft 63 extending upwardly through an opening, not shown, in a mounting bracket 64 to an upper terminal portion 65 which has a nut 66 threadingly engaging the same. A spring 67 acts between the underside of the bracket 64 and a collar 68 attached to the shaft 63 adjacent the pressure pad portion 62 of the pressure applying member 61.

The mounting bracket 64 is attached to the frame members 42 of the stripping and lifting device 18. The individual ones of the pressure applying members 61 apply pressure on the score 32 placed on the glass template 31 at the points indicated by the reference numeral 69 in FIG. 3. As best seen in that figure, the points of application of the pressure on the initial score 32 act across the score 32. Also each pair of pressure points act on either side of the secondary score 43 placed on the glass surface by the secondary scoring apparatuses 41.

Operation

In operation of the glass cutting and stripping apparatus 10, in accordance with the method of this invention, the glass bracket 31 is scored at the glass scoring station 12 so that the glass template shape 33 is defined therein. The glass bracket is thereafter indexed on the belt 17 to the glass stripping and edge trim removing station 13. Upon index, portions of the individual glass bracket are brought to positions underlying each of the six secondary scoring apparatuses 41 mounted on the stripping and lifting device 18. The stripping and lifting device is moved to its leftmost position as viewed in FIG. 2 and will, in that position, overlie the glass template. The cam strips 56 are lifting up the portions of the glass bracket underlying the secondary scoring apparatuses. When the stripping and lifting device is in its leftmost position, an air cylinder 71 of the device is actuated so as to move the frame members 42 of the device generally downward towards the glass bracket 31 located therebelow.

In accordance with the teachings of the method of this invention, downward movement of the frame members 42 towards a lower, terminal position of the stripping and lifting device 18 bring the pressure pad portion 62 of each of the pressure applying members 61 into engagement with the score 32 at the points indicated by the numeral 69 in FIG. 3. The application of pressure places the unscored undersurface of the bracket in tension and causes a complete running of the fissures defined by the score 32 down through the unscored surface of the glass. In such a manner, the glass template 33 is cut from the glass bracket 31. The amount of pressure applied at each point is approximately 12 lbs. of force for a glass bracket having a nominal thickness of ⅛ inch. This pressure is generally not sufficient to run the score out through the unscored area of glass between the score 32 and the lateral edges of the glass bracket. FIG. 6 graphically illustrates the application of force by the pressure pads 62 of the members 61 to the glass template 31. The pressure flexes the portion of the bracket immediately below each one of the secondary scoring apparatuses 41 over its associated cam strip 56.

The springs 67 of each of the pressure applying members 61 yield but continue to apply force on the glass bracket after the running of the score and during further downward movement of the stripping and lifting device 18. During this additional downward movement of the device 18, each of the cutter wheels 53 of the secondary scoring apparatuses 41 are brought into contact with the glass bracket at positions which overlie individual ones of the cam strips 56. This action is graphically represented in FIG. 7.

As will be best appreciated by viewing FIG. 4, the continued downward movement of the frame members 42, after initial contact of the cutter wheels 53, will cause each of the wheels to move along the surface of the glass bracket as each of the members 46 pivots in a direction against the bias of their associated springs 49. This cutter movement places a secondary score 43 on the glass bracket 31 at each of the locations graphically depicted in FIG. 3. The length of each of the scores is determined by the distance through which the device 18 is moved downwardly after the cutter wheels have engaged the surface of the glass.

The preferred direction of the score on the glass bracket is from a lateral edge of the bracket inwardly toward the score 32 thereon. More particularly, the secondary score is commenced at a position close to a lateral edge of the glass bracket 31. As the stripping and lifting device 18 is moved generally downward towards its terminal position, each of the cutter wheels 53 move toward the score 32 on the bracket thereby to place the secondary scores 43 on the bracket.

During movement of the cutter wheels 53 across the surface of the glass bracket 31, the pressure applying members 61 continue the application of pressure through pressure pads 62 on the surface of the bracket. As previously described, pressure is applied on both sides of each of the cam strips 56 whereby after formation of a secondary score which weakens the glass surface, the glass will open along the secondary score 43 and the pieces of edge trim 34 will be generated. Upon initial separation, the pieces of edge trim will have their lateral edges positioned closely adjacent one another or the lateral edges of the glass template 33.

In accordance with the teachings of the method of this invention, once an individual secondary score 43 has been opened, the biasing action of the spring 49 of an associated one of the secondary scoring apparatuses 41 operates through the pivotable member 46 on its associated cutter wheel 53. This biasing action moves the cutter wheel 53 downwardly into a position between the adjacent lateral edges of associated pieces of edge trim to separate the edges at that particular position. This action is graphically illustrated in FIG. 8 which shows the downward movement of the wheel terminated by its engagement with the belt 17.

By the time the cutter enters the position between the lateral edges of pieces of edge trim, the stripping and lifting device 18 has been moved downward to its terminal position. The operation of the air cylinder 71 is reversed at this time to move the frame members 18 of the device upwardly again. During the initial downward movement of the stripping device 18, spring loaded suction cups 72, best seen in FIG. 2, are brought into engagement with the upper surface of the bracket 31 prior to either the scoring or application of pressure thereto. Since these suction cups are spring loaded, they yield during the continued downward movement of the frame members 42 to their terminal position. When the air cylinder 71 is reversed, the spring loaded suction cups pick up the glass template 33 from the belt 17.

During the initial portion of the upward movement of the frame members 42 of the stripping and lifting device 18 from the lower terminal position, the springs 49 of each of the secondary scoring apparatuses 41 continues to pivot its associated cutter wheel 53 back toward a normal position. By such action, the cutter wheel 53 moves along at least a portion of the length of the open score between the lateral edges of adjacent pieces of edge trim. This action separates the lateral edges of adjacent pieces of edge trim freeing the edge trim pieces from one another and from the glass template. Also, the particular placement of the secondary scores on the glass results in a camming of the pieces of edge trim back away from one another and from the glass template as the cutter wheels move along associated ones of the open score. Thus the lateral edges of the pieces of edge trim are moved away from the glass template and the template may be easily picked up by the stripping and lifting device without damage. The edge trim remains behind on the belt 17.

The stripping and lifting device 18, now supporting the glass template 33, is moved on wheels 73 over a guide track 74 to a position whereat the glass template 33 is directly above the unloading station 15. At this position, the air cylinder 71 is actuated in a downward direction and thus deposits the template on a plurality of rollers 76 at the unloading station.

The endless belt 17 is now indexed to deposit the edge trim 34 in a hopper at the glass disposal station 14. This index of the belt 17 brings a new glass bracket 31 to the glass scoring station 12 and a scored glass bracket to the stripping and edge trim removing station 13 so that another cycle of operation may be commenced.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A method of separating adjacent pieces of glass edge trim remaining after a glass template has been cut from a glass bracket, which method comprises the steps of:
   moving a glass scoring tool over the surface of the glass bracket in an area of the glass bracket between its lateral edge and the glass template shape defined thereon thereby to place a score on the surface;
   breaking the glass along the score to open the score, the lateral edges of the adjacent pieces of edge trim defined by the open score being in close proximity to one another;
   moving a separating tool downwardly into a position between the adjacent lateral edges of the pieces of edge trim to separate the lateral edges at that position; and
   moving the separating tool along at least a portion of the length of the open score thereby to separate the lateral edges of the adjacent pieces of edge trim.

2. The method of separating adjacent pieces of glass edge trim as specified in claim 1 wherein the separating tool is the scoring tool.

3. The method of separating adjacent pieces of glass edge trim as specified in claim 2 wherein the glass scoring tool both is moved in one direction to accomplish the scoring of the glass and is moved in the opposite direction to accomplish the separation of the lateral edges of the adjacent pieces of edge trim.

4. A method of separating adjacent pieces of glass edge trim remaining when a score defining a glass template shape on a glass bracket is run through the bracket, which method comprises the steps of:
   moving a glass scoring tool over the surface of the glass bracket in an area of the bracket between its lateral edge and the glass template shape defined thereon thereby to place a score on the surface, the direction of movement of the scoring tool being from the lateral edge toward the template shape defined on the glass bracket;
   breaking the glass along the score to open the score, the lateral edges of the adjacent pieces of edge trim defined by the open score being in close proximity to one another;
   moving the glass scoring tool downwardly into a position between the adjacent lateral edges of the pieces of edge trim to separate the lateral edges at that position; and moving the scoring tool along at least a portion of the length of the open score thereby to separate the lateral edges of the adjacent pieces of edge trim, the direction of movement of the scoring tool being from the defined template shape toward the lateral edge of the bracket.

5. The method of separating adjacent pieces of glass edge trim as specified in claim 4 wherein the glass template shape is of closed configuration having sharp corners; wherein a plurality of scoring tools are utilized to score the bracket and thereafter separate the lateral edges of adjacent pieces of edge trim; and wherein each of the scoring tools is spaced from the sharp corners of the template shape.

6. The method of separating adjacent pieces of glass edge trim as specified in claim 4 or 5 wherein the glass is broken along the score lines thereon by raising the glass upwardly along the score line while applying pressure on the glass at areas on either side of the score lines.

References Cited

UNITED STATES PATENTS

| | | | |
|---|---|---|---|
| 1,887,564 | 11/1932 | Sherts | 225—2 |
| 2,508,017 | 5/1950 | Echter et al. | 225—2 |
| 3,372,847 | 3/1968 | Walters et al. | 225—96.5 X |

FRANK T. YOST, Primary Examiner

U.S. Cl. X.R.

225—96.5, 97